Feb. 10, 1931. L. N. LAUER 1,792,432
CONTROLLING DEVICE FOR BRAKE CAMS
Filed Aug. 30, 1929 3 Sheets-Sheet 2
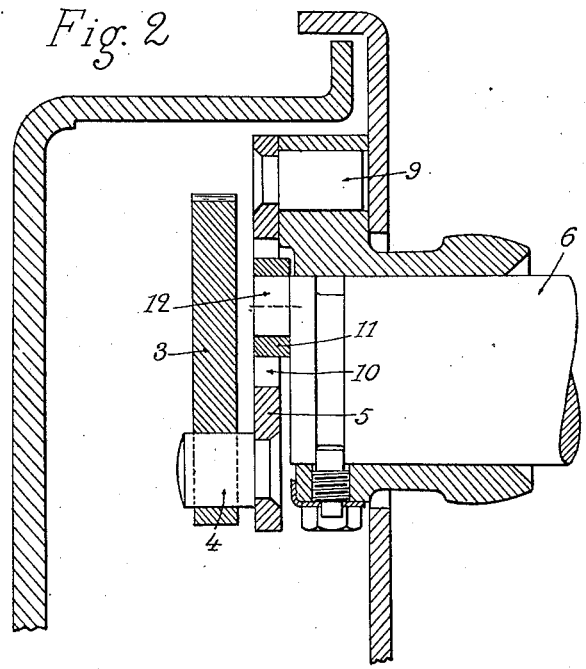
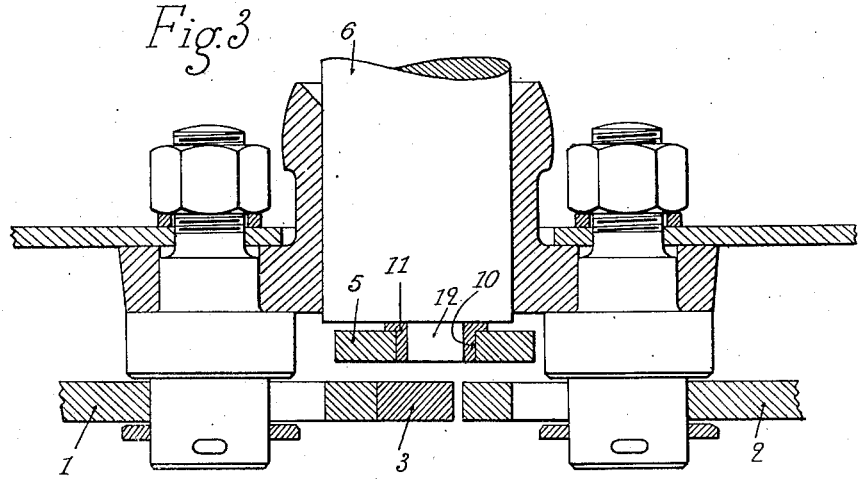

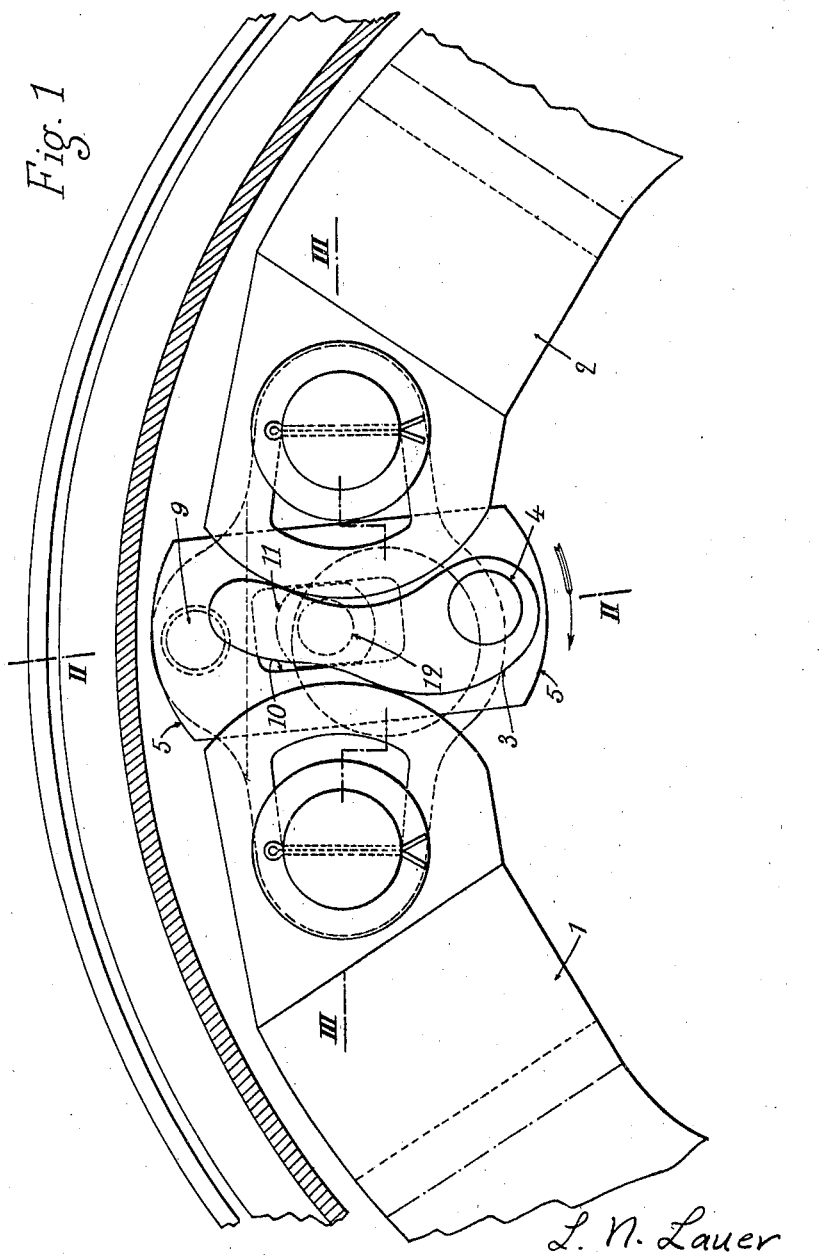

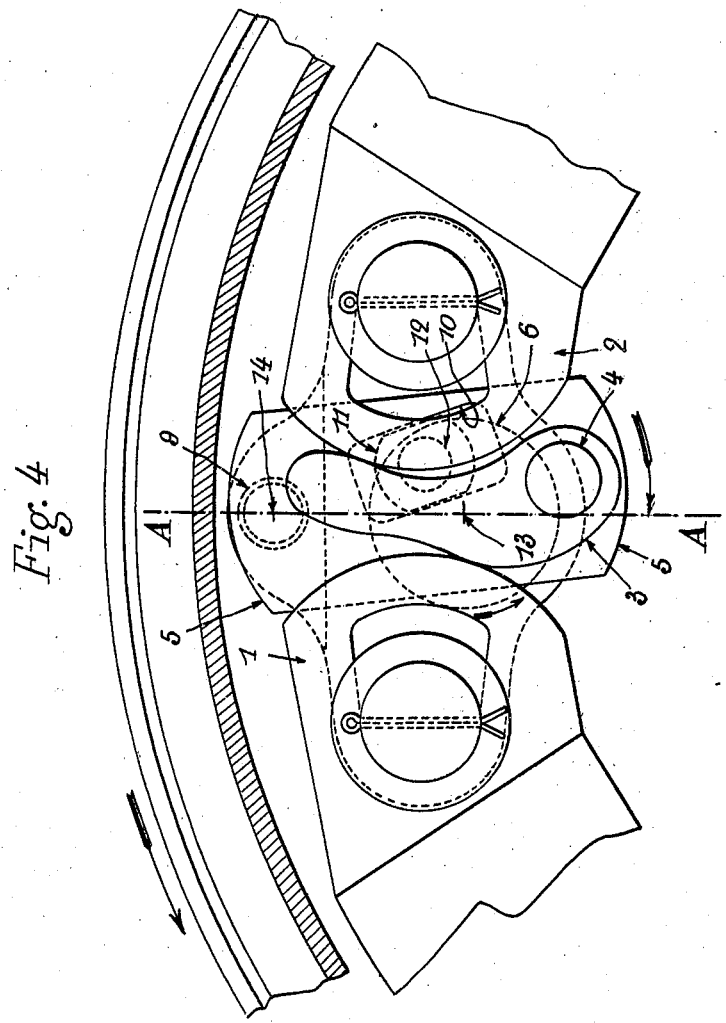

Patented Feb. 10, 1931

1,792,432

UNITED STATES PATENT OFFICE

LÉON NICOLAS LAUER, OF PARIS, FRANCE, ASSIGNOR TO SOCIÉTÉ ANONYME DES ETABLISSEMENTS PIGANEAU & CO., OF SANSJILLON CLICHY, SEINE, FRANCE

CONTROLLING DEVICE FOR BRAKE CAMS

Application filed August 30, 1929, Serial No. 389,528, and in France May 3, 1929.

In certain known types of braking devices, the loose cam which serves to expand the brake shoes is pivoted to an arm which is directly secured to the controlling shaft. The direction of rotation of said controlling shaft is such that the cam will first act upon the brake shoe whose action is to be predominant when the vehicle is going ahead. However, it may happen that for constructional reasons it is necessary to rotate the said controlling shaft in the contrary direction to the one required to act in the first place upon the brake shoe whose action is to be predominant.

The present invention has for its object a controlling device which, in spite of this reversal of the direction of rotation of the controlling shaft, will permit an action upon the brake shoes in the proper direction when the vehicle is going ahead. For this purpose, the arm to which the cam is pivoted, is itself pivotally mounted upon a fixed axle, this being actuated, relatively to the said controlling shaft, on the side opposite the axis of pivotation of the cam upon the said arm, which latter is rotatable about the said fixed axle under the action of a crank pin which is mounted on the said controlling shaft and acts upon the arm at a point situated between the said fixed axle and the axis of the controlling shaft.

Further characteristics and advantages of the invention will be specified in the following description.

The accompanying drawing shows by way of example an embodiment of the invention.

Fig. 1 is a partial elevational view of the controlling device.

Fig. 2 is a section on the line 2—2 of Figure 1.

Fig. 3 is a section on the line 3—3 of Figure 1.

Fig. 4 is a view of a modification.

The front expanding member or shoe 1 and the rear shoe 2 of a left hand front wheel, for instance, may be expanded by the use of a cam 3 which is pivoted by means of an axle 4 to an arm 5, this arm being in the known devices directly secured to the controlling shaft 6 which in this case is rotatable in the clockwise direction, viewed from the front of Figure 1. For this direction of rotation of the shaft 6, the cam 3 will first act upon the shoe 1, which may be for instance a loose shoe, and this latter, when in contact with the brake drum, which turns in the counter-clockwise direction when the vehicle is going ahead, acts upon another shoe pivoted to the said shoe 1 and pivotally mounted on a stationary axle, whereby this second shoe will be placed in contact with the drum. Hence the action on the shoe 1 is the predominant factor, since its movement determines the motion of the second shoe when the vehicle is going ahead.

For constructional reasons, it may be necessary that the controlling shaft 6 be turned only in the contrary direction to the preceding when operating the brakes, that is, in the counter-clockwise direction when viewed from the front of Figure 1. If the arm 5 were still directly secured to the shaft 6, the cam 3 would be moved towards the right (Fig. 1) and would first act upon the shoe 2 until the latter attains a stationary point, and it is only at this time that the cam 3 would act upon the shoe 1 by using the shoe 2 as a fulcrum. The operation of the device, when the vehicle is going ahead, would not be correct, since the shoe 1 would not be applied first on the drum in order to be drawn along with said drum and to push the second shoe 2 against the drum.

The device for controlling the cam according to the present invention has for its object to establish the normal action of the cam 3 when, in order to operate the brakes the shaft 6 is turned only in a counter clockwise direction, that is, to control the said cam in such manner that in spite of the reversed rotation of the controlling shaft 6, the said cam will act in the first place upon the shoe 1. For this purpose, the arm 5 is not directly secured to the shaft 6, but is pivoted to a stationary axle 9 which is disposed, with reference to the said shaft, on the other side from the pivot axle 4. The said arm 5 has a guide slot 10 in which is movable a sliding member 11 mounted on a crank pin 12 forming part of the said controlling shaft 6 and eccentric with reference to the axis of said shaft. The said crank pin, when in the idle position, is situated between the axis of the controlling shaft 6 and the pivot axis 9. As shown in Figure 1, when the said controlling shaft is turned in the counter-clockwise direction, the crank pin 12 will be moved to the left together with the said sliding member 11 and the arm 5; the said arm 5, when pivoting on the stationary axle 9, will move the axle 4 and the cam 3 to the left, and this in the first place moves the shoe 1 whose action is to predominate when the vehicle is going ahead. This arrangement provides the desired braking action, in spite of the reversed rotation of the controlling shaft 6.

The lever arm entering into the action of the several members controlling the cam 3, or the braking ratios are determined by the length of the arm 5 and by the distance separating the crank pin 12 from the axis of the shaft 6.

Furthermore, by disposing for instance, when in the idle position, the crank pin 12 (Fig. 4) to the right of a plane A—A passing through the axis 13 of the controlling shaft 6 and the axis 14 of the pivot 9, it is observed that the crank pin 12 and the sliding member 11 will be displaced, when the brakes are applied, in the slot 10 towards the pivot 9, thus increasing the length of the lever arm between the pivoting axle 4 and the crank pin 12. If the said crank pin 12 is disposed to the left of the plane A—A, this lever arm will diminish during the braking action. Hence the position of the said crank pin with reference to this plane A—A will permit to obtain an increasing or diminishing effort during the braking action.

Obviously, the form of construction herein described and represented is susceptible of numerous modifications without departing from the spirit of the invention.

Having now described my invention what I claim as new and desire to secure by Letters Patent is:

1. In a braking device, two brake shoes with adjacent ends adapted to be moved towards and away from each other, a stationary axle, an arm pivotally mounted on said axle, a control shaft substantially at right angles with said arm, an expanding member between said adjacent ends of said shoes pivotally mounted on said arm on one side of the axis of said control shaft, and means for operatively connecting said shaft with said arm on the other side of the axis of said control shaft.

2. In a braking device, two brake shoes with adjacent ends adapted to be moved towards and away from each other, a stationary axle, an arm pivotally mounted on said axle, a control shaft substantially at right angles with said arm, an expanding member between said adjacent ends of said shoes pivotally mounted on said arm on one side of the axis of said control shaft, and means secured on said control shaft and slidingly connected with said arm on the other side of the axis of said control shaft.

3. In a braking device, two brake shoes with adjacent ends adapted to be moved towards and away from each other, a stationary axle, an arm pivotally mounted on said axle, a control shaft substantially at right angles with said arm, an expanding member between said adjacent ends of said shoes pivotally mounted on said arm on one side of the axis of said control shaft and a crank pin rigidly connected with said control shaft and slidingly connected with said arm on the other side of the axis of said control shaft.

4. In a braking device, two brake shoes with adjacent ends adapted to be moved towards and away from each other, a stationary axle, an arm pivotally mounted on said axle, a control shaft substantially at right angles with said arm and distant from said axle, an expanding member between said adjacent ends of said shoes pivotally mounted on said arm on the side opposite said axle with reference to said control shaft, and means for operatively connecting said shaft with said arm between said axle and the axis of said control shaft.

5. In a braking device, two brake shoes with adjacent ends adapted to be moved towards and away from each other, a stationary axle, an arm pivotally mounted on said axle, a control shaft substantially at right angles with said arm and distant from said axle, a stud on said arm on the side opposite said axle with reference to said control shaft, an expanding member between said adjacent ends of said shoes pivotally mounted on said stud, and means for operatively connecting said shaft with said arm between said axle and the axis of said control shaft, the connecting point with said arm being situated on one side of a line passing through said axle and said axis of said control shaft.

In testimony whereof I have signed my name to this specification.

LÉON NICOLAS LAUER.